US005520043A

United States Patent [19]

Koelle et al.

[11] Patent Number: 5,520,043

[45] Date of Patent: May 28, 1996

[54] DEVICE FOR CRANKSHAFT-SYNCHRONOUS DETECTION OF A PERIODICALLY CHANGING VARIABLE

[75] Inventors: Ulrich Koelle, Schwieberdingen; Andreas Lock, Reutlingen, both of Germany; Andreas Roth, Saint-Ouen, France

[73] Assignee: Robert Bosch GmbH, Stuttgart, Germany

[21] Appl. No.: 392,923

[22] PCT Filed: Jun. 22, 1994

[86] PCT No.: PCT/DE94/00716

§ 371 Date: Feb. 27, 1995

§ 102(e) Date: Feb. 27, 1995

[87] PCT Pub. No.: WO95/02122

PCT Pub. Date: Jan. 19, 1995

[30] Foreign Application Priority Data

Jul. 5, 1993 [DE] Germany .......................... 43 22 311.7

[51] Int. Cl.[6] .................................................. G01M 15/00

[52] U.S. Cl. .................................... 73/117.3; 364/431.01; 73/115

[58] Field of Search .................................. 73/115, 117.3, 73/118.2; 364/431.01

[56] References Cited

U.S. PATENT DOCUMENTS

| | | | |
|---|---|---|---|
| 3,886,817 | 6/1975 | Paul et al. | 73/115 |
| 4,343,180 | 8/1982 | Herden et al. | 73/115 |
| 4,403,505 | 9/1983 | Hattori et al. | 73/115 |
| 4,424,709 | 1/1984 | Meier et al. | 73/115 |
| 5,076,098 | 12/1991 | Miwa | 73/115 |
| 5,125,267 | 6/1992 | Kuroda et al. | 73/115 |
| 5,127,262 | 7/1992 | Demizu et al. | 73/115 |
| 5,321,979 | 6/1994 | McKendry et al. | 73/115 |
| 5,359,518 | 10/1994 | Wimmes | 73/115 |
| 5,359,519 | 10/1994 | Jehanno | 73/115 |
| 5,400,648 | 3/1995 | Mahr | 73/115 |

FOREIGN PATENT DOCUMENTS 3803276 8/1989 Germany .

*Primary Examiner*—Richard Chilcot
*Assistant Examiner*—George M. Dombroske
*Attorney, Agent, or Firm*—Michael J. Striker

[57] ABSTRACT

A device is disclosed for crankshaft-synchronous detection of a periodically changing variable of an internal combustion engine, for example the load, which is measured by a sensor whose output signal which is preprocessed or filtered in a suitable fashion is sensed with a selectable timing pattern. The start of sampling is resynchronized for each segment, the signal of a CA sensor being used for synchronization, the said CA sensor sensing a disc connected to the crankshaft and outputting one signal edge per segment. The combination for crankshaft-synchronous sampling with constant timing with respect to the segment permits the use of different load detection sensors with improved accuracy in comparison with previously used methods. The average value of the load for each segment can be determined from the sampled measured values and the quantity of air inducted per power cycle can also be determined.

10 Claims, 1 Drawing Sheet

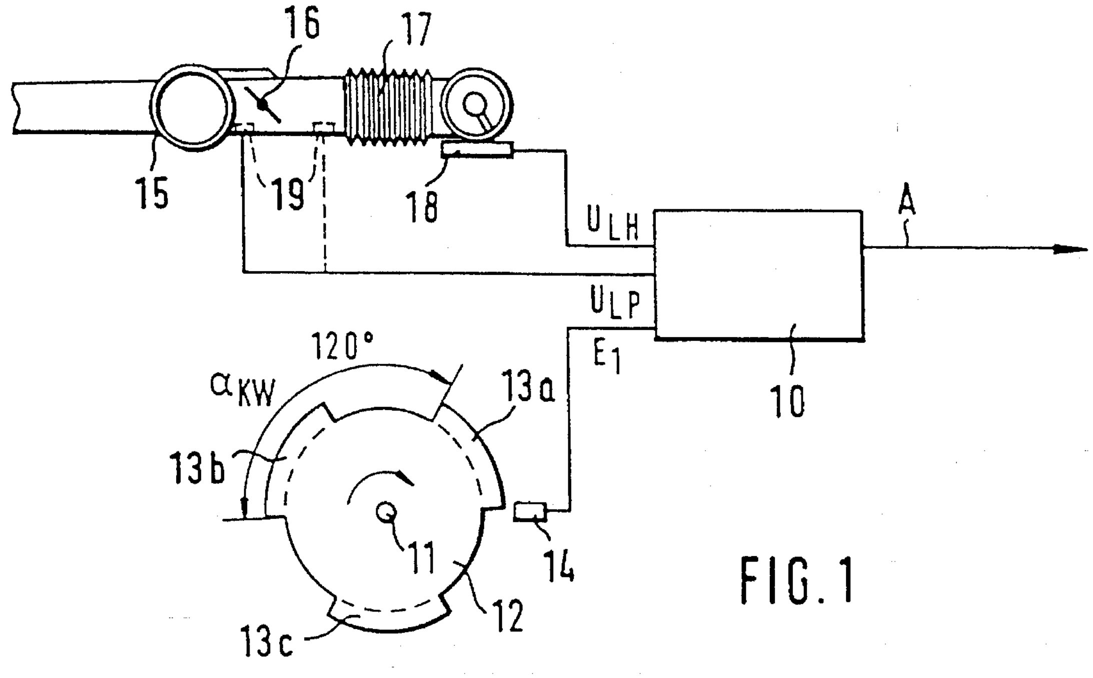
FIG. 1
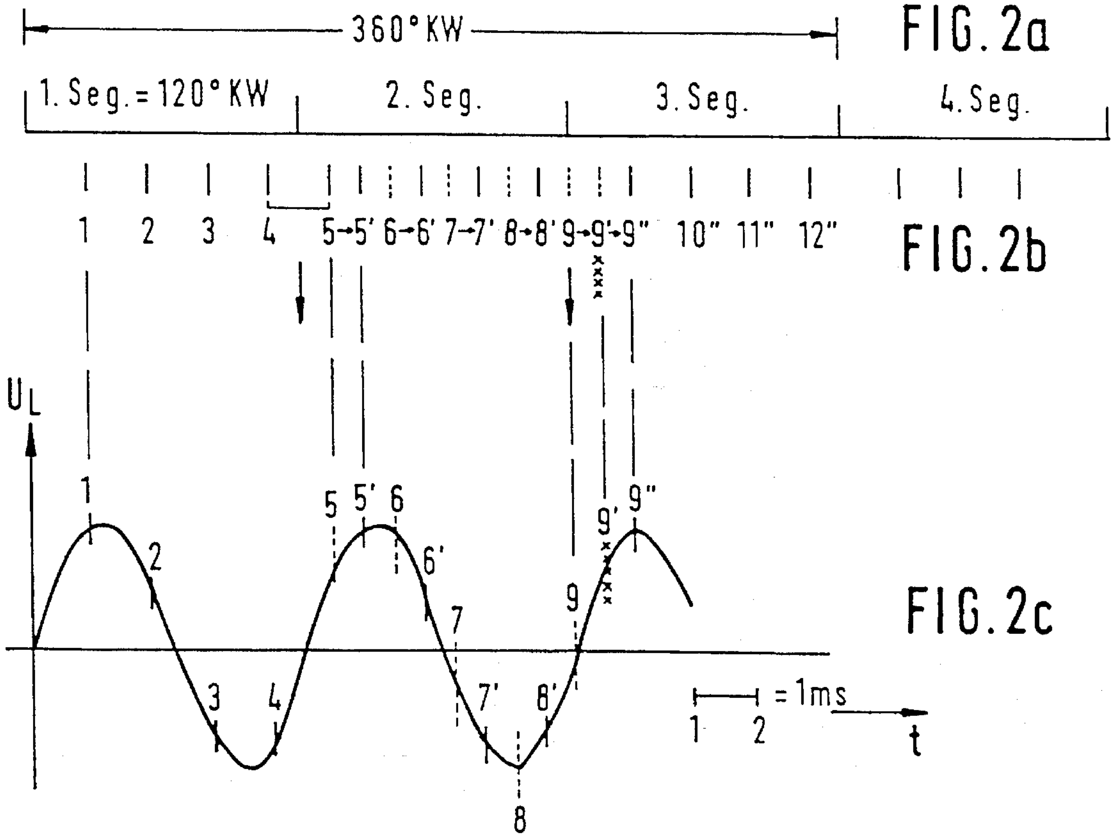
FIG. 2a
FIG. 2b
FIG. 2c

DEVICE FOR CRANKSHAFT-SYNCHRONOUS DETECTION OF A PERIODICALLY CHANGING VARIABLE

PRIOR ART

The invention is based on a device for crankshaft-synchronous detection of a periodically changing variable in an internal combustion engine, in particular the load, of the generic type of the main claim.

It is known that the negative pressure in the induction pipe of an internal combustion engine pulsates in time with the power cycle of the internal combustion engine. However, in order to control the internal combustion engine precisely the actual air flow rate is required. In many cases, an equivalent variable such as the average value of the induction pipe pressure is used. Therefore, it is proposed for example in the German Offenlegungsschrift DE-A 38 03 276 to sense the induction pipe pressure in an angle-synchronous fashion twice per period length and to damp either the signal obtained or the induction pipe pressure itself by means of suitable filters in such a way that a quasi-sinusoidal signal characteristic is obtained. If this signal is sampled twice per ignition interval, the average value can be calculated directly from two successive values.

For modern internal combustion engines this average value formation is still too imprecise. Furthermore, with this method it is only possible to determine the average value and not the precise pressure characteristic or the precise air flow rate, but this is precisely what is desired for some control measures.

ADVANTAGES OF THE INVENTION

In contrast, the device according to the invention with the characterizing features of the main claim has the advantage that, on the one hand, a very precise average value formation is possible and, on the other hand, the precise induction pipe pressure characteristic or the precise characteristic of the quantity of air inducted can be determined. It is therefore also possible to determine precisely the quantity of air inducted per power cycle. Overall, a particularly precise and reliable load determination is possible.

Furthermore, it is advantageous that the achieved measured values can be compared with one another from segment to segment and thus from power cycle to power cycle, and at the same time it is possible to form average values which are associated with the individual segments and are then also available for controlling the internal combustion engine.

These advantages are achieved in that the signal characteristic is sampled with a high sampling rate, the start of the sampling being synchronized in relation to the crankshaft and the sampling therefore starting at the same point for each segment. This promotes synchronization with the periodically oscillating load signal. By integrating over a power cycle the associated quantity of air inducted is calculated.

Suitable filtering of the periodically oscillating signal can be carried out before sampling but, in contrast with the solution disclosed in the German Offenlegungsschrift DE-A 38 03 276, is not absolutely necessary.

By means of the measures specified in the subclaims, advantageous developments of the device disclosed in the main claim are possible.

DRAWING

The invention is illustrated in the drawings and is explained in greater detail in the subsequent description. In particular, FIG. 1 shows a diagrammatic illustration of the device according to the invention. In FIGS. 2*a*, 2*b* and 2*c*, associated signal sequences are illustrated by means of which the invention is explained.

DESCRIPTION OF THE EXEMPLARY EMBODIMENTS

In FIG. 1, the parts of an internal combustion engine which are essential to the invention are illustrated diagrammatically. Here, 10 designates the control unit, 11 the crankshaft and 12 a disc which is connected to the crankshaft 11 and rotates therewith.

The surface of the disc 12 has a number of marks 13*a*, 13*b*, 13*c* which is matched to the number of cylinders of the internal combustion engine. In the case illustrated in FIG. 1 there are three marks, such a disc is used in a 6-cylinder internal combustion engine. A region which is designated by CA forms a so-called segment. This region is defined in FIG. 1 as an angle between the rear edge of the mark 13*a* and the rear edge of the mark 13*b*.

The disc 12 is sensed by a fixed sensor 14 whose output signal is fed as an input signal $E_1$ to the control unit 10 and further processed there.

15 designates the induction pipe of the internal combustion engine, 16 represents diagrammatically the throttle valve which is arranged in the induction pipe. 17 represents a region of the induction pipe which acts as a pneumatic filter and 18 is a hot-wire air flow rate meter HLM which records the throughflowing air and whose output signal is fed to the control unit 10 as a signal $U_{LH}$.

Instead of an HLM, a HFM can also be used. 19 designates a pressure sensor which is arranged in the induction pipe, for example at one of the points shown and measures the induction pipe pressure. This sensor is also connected to the control unit 10 in which the output signals $U_{LP}$ of the pressure sensor is also processed. The control unit 10 supplies output signals A for controlling the internal combustion engine, in particular the ignition and injection.

The output signals of the load sensor, that is to say of the pressure sensor or of the air flow rate meter are preprocessed in a suitable way, in particular they can be filtered in such a way that a periodic signal characteristic is produced which is then further processed.

In FIG. 2*a*, a signal which is obtained from the crankshaft sensor is illustrated, only those signal components being entered which are produced when the rear sides of the marks 13*a*, 13*b*, 13*c* move past the crankshaft sensor 14. The distance between the signal edges is 120°/CA for the exemplary embodiment according to FIG. 1, it corresponds therefore to precisely one segment.

In FIG. 2*c*, the characteristic of the load signal $U_L$ is illustrated. The latter is either the signal $U_{LH}$ which originates from the hot-wire or hot-film air flow rate meter or the signal of the pressure sensor $U_{LP}$ arranged in the induction pipe. This signal oscillates periodically with a period length which corresponds to a segment length or an angle of [lacuna] CA.

Moreover, the load characteristic according to FIG. 2*c* is only illustrated diagrammatically, but this is not essential for comprehension of the invention. In precise terms, the hot-wire air flow rate meter supplies a direct voltage signal which is dependent on the air flow and has a sinusoidal pulsation whose amplitude becomes smaller at larger rpms. In the return flow range at approximately 800 to 1400 rpm, depending on the engine the output signal corresponds during pulsation to the absolute value of a sinusoidal oscillation.

The output signal of the pressure sensor constitutes a direct voltage signal which is essentially linearly dependent on the pressure and has a superimposed sinusoidal pulsation over the entire rpm range. However, the actual signal characteristic is irrelevant for understanding the invention, therefore only the periodic component is illustrated.

If the pressure sensor is applied directly in the induction pipe, an additional filter can be used, but it is not absolutely necessary in order to obtain a signal which can be evaluated reliably.

The signal according to FIG. 2*c* is sampled in the control device in a specific time pattern, for example in a 1 millisecond time pattern. Here it is essential for the sampling for each segment to start at the same point. The synchronization of the sampling takes place as a function of the signal edges according to FIG. 2*a*. If this synchronization were not carried out, there would be a beat in the load signal as a result of the constant sampling intervals even in the steady operating state of the engine.

The first sampling takes place in the illustrated exemplary embodiment one millisecond after the occurrence of the first edge of the signal according to FIG. 2*a*. The first sampling is designated in FIGS. 2*b* and 2*c* by 1. The second sampling takes place one millisecond later and is designated by 2. The fourth sampling is the last in the first segment.

The fifth sampling takes place not one millisecond after the fourth, but rather one millisecond after the occurrence of the second edge of the signal according to FIG. 2*a*. It is therefore not sampled at the point designated by 5 but rather at the point designated by 5'. The same applies for the sixth/eighth sampling, that is to say at 6' to 8' sampling takes place and not at 6 to 8 as in the unsynchronized case. As a result, it is ensured that the sampling is synchronized for each segment and takes place at the same point.

At the transition into the third segment the sampling takes place at 9" and not at 9 or 9'. Here, the point 9" follows one millisecond after the third edge of the signal according to FIG. 2*a*.

The average value formation takes place by means of one segment in each case. The average load signal of the first segment is thus formed from the first four sampled load signal values. This average value corresponds to the average value of the second segment which is formed from the sampled values 5' to 8'. In the third segment, the sampled values 9" to 12" are used for average value formation.

In order to determine the quantity of air which is inducted per power cycle, the load signal (of HLM or HFM) is integrated over one power cycle, that is to say over one period length, the following applies:

$t_{n+1}$ $$m_L = m_L(t)\ dt$$

$t_n$ n and n+1 representing one segment, and the crankshaft rotating through an angle CA between $t_n$ and $t_{n+1}$.

In an internal combustion engine, a combination of the two detection systems with optionally one pressure sensor or one air flow rate meter is conceivable if both signals are preprocessed in such a way that the filter time constants are of the same order of magnitude. A crankshaft-synchronized or rpm-synchronized sampling in the 1 ms time pattern then permits a uniform load detection.

The method disclosed can be used both for pressure and for HFM/HLM systems. With a compatible sensor interface, a control unit which processes the signals can thus be used identically in terms of hardware by switching over data sets for both data detection systems as desired.

The detected load is used in the control unit for controlling the internal combustion engine, in particular in conjunction with an optimized ignition and injection.

FIG. 1 shows an exemplary embodiment with a segment disc. An increment disc can also be used with a plurality of marks, e.g. 60-2, the two missing marks forming a reference mark. The increment disc is then to be designed in such a way that a specific number of marks, e.g. ten, form a segment disc, and therefore extend over an angle of $\alpha_{CA}=60°$ in a six cylinder engine.

With appropriate adaptation, the disc can also be used in conjunction with the camshaft. It is decisive that the sampling of the periodic signal to be evaluated should take place with a period length of one segment length in each segment at the same point (FIG. 2*c*).

We claim:

1. Device for crankshaft-synchronous detection of a periodically changing variable of an internal combustion engine, having a sensor which outputs a signal which is dependent on a position of the crankshaft and has at least one edge per segment, one segment corresponding to a crankshaft angle range which depends on a number of cylinders of the internal combustion engine and is specified in such a way that it corresponds to one period length of a periodically changing variable, and having a further sensor which outputs a load-dependent signal, characterized in that the load-dependent signal is sampled with a suitable timing pattern and a start of sampling takes place in each segment at a same interval from a corresponding edge of a crankshaft angle-dependent signal.

2. A device according to claim 1, characterized in that the periodically changing variable is a pressure in an induction pipe of the internal combustion engine and a pressure sensor is used as the sensor.

3. Device according to claim 1, characterized in that an average value is formed from the sampled values, averaging taking place over one segment in each case.

4. Device according to claim 3, characterized in that, in order to form the crankshaft angle-dependent signal, a disc which is connected to the crankshaft and has a number of marks corresponding to half the number of cylinders is sensed by a sensor.

5. Device according to claim 1, characterized in that a sampling of the periodically changing variable takes place at constant time intervals with an interval of milliseconds.

6. Device according to claim 1, characterized in that the periodically changing variable is an air flow in an induction pipe of the internal combustion engine and an air flow rate meter, is used as the sensor.

7. Device according to claim 1, characterized in that a sampling and the evaluation of the signals takes place with a control unit of the internal combustion engine.

8. Device according to claim 1, characterized in that an adaptation of the filter constants and a sampling rate takes place in such a way that the periodically changing variable occurs over all the segments as precisely and uniformly as possible.

9. Device according to claim 1, characterized in that the load signal is integrated over one segment in order to determine a quantity of air inducted per power cycle.

10. Device according to claim 1, characterized in that in order to form the crankshaft angle-dependent signal an increment disc is sensed which is connected to one of the crankshaft and camshaft and the disc has a plurality of marks, a prescribable number of marks extending over an angular range $\alpha_{CA}$ which corresponds to one segment length.

* * * * *